United States Patent [19]

Render et al.

[11] 4,331,917

[45] May 25, 1982

[54] SPEED AND DIRECTION SENSING CIRCUIT

[75] Inventors: Michael L. Render, Peoria; John T. Armstrong, Jr., Chillicothe, both of Ill.

[73] Assignee: Caterpillar Tractor Co., Peoria, Ill.

[21] Appl. No.: 145,066

[22] PCT Filed: Dec. 13, 1979

[86] PCT No.: PCT/US79/01088

§ 371 Date: Dec. 13, 1979

§ 102(e) Date: Dec. 13, 1979

[51] Int. Cl.³ .......................... G01P 3/48; G01P 3/54
[52] U.S. Cl. ..................................... 324/166; 340/672
[58] Field of Search ............... 324/166, 165, 173, 171; 361/236; 340/672, 670; 73/495, 510, 518

[56] References Cited

U.S. PATENT DOCUMENTS

| 2,926,335 | 2/1960 | Bower | 324/172 X |
| 3,436,656 | 4/1969 | Brano, Jr. | 324/178 |
| 3,728,565 | 4/1973 | O'Callaghan | 324/165 X |
| 4,028,686 | 6/1977 | Wilson et al. | 324/173 X |
| 4,142,152 | 2/1979 | Fincher | 324/165 |
| 4,142,153 | 2/1979 | Smith | 324/165 |

FOREIGN PATENT DOCUMENTS 2252159 5/1974 Fed. Rep. of Germany ...... 324/166

OTHER PUBLICATIONS

Crisp, Asynchronous Direction of Motion Detection, IBM Technical Disclosure Bulletin, vol. 15, No. 1, Jun. 1972, pp. 114, 115.

Crisp, Direction & Speed Detection Circuit, IBM Technical Disclosure Bulletin, vol. 15, No. 4, Sep. 1972, p. 1198, 1199.

Jackson, Logical Motion & Direction Detection, IBM Technical Disclosure Bulletin, vol. 14, No. 12, May 1972, pp. 3672, 3673.

Primary Examiner—Stanley T. Krawczewicz
Attorney, Agent, or Firm—Krass and Young

[57] ABSTRACT

A speed and direction detector for rotating bodies such as gears (10) including a pair of spaced sensors (14) mounted adjacent the gear teeth (12) to develop phase-shifted alternating signal waveforms, and a decoder (20) to develop a sequence of output signal conditions (S0–S3) depending upon the relation between the alternating waveform values. Signal stage memories (26, 28, 30, 32, 34, 36) utilizing flip-flops and gates connect the decoder outputs to an up/down counter (42, 44) which is incremented or decremented according to gear rotation direction only if a complete signal condition sequence occurs.

10 Claims, 4 Drawing Figures

*Fig-3* (ASSUMING FORWARD MOTION)

| OUTPUT STATE DECODER 20 | A | B |
|---|---|---|
| $S_0$ | 1 | 0 |
| $S_1$ | 1 | 1 |
| $S_2$ | 0 | 1 |
| $S_3$ | 0 | 0 |

SPEED AND DIRECTION SENSING CIRCUIT

DESCRIPTION

TECHNICAL FIELD

This invention relates to systems for detecting the speed and direction of motion of a moving part by performing logic functions on signal level transitions which are generated as portions of the part travel past a sensor. The system is capable of distinguishing between signals which result from substantially continuous motion of the part and signals which result from intermittent motion reversals or "jitter".

BACKGROUND ART

It is known to determine the motion of a part such as a rotating gear, wheel, or shaft by generating a signal exhibiting alternately opposite transitions between two discrete signal levels as a surface of the part travels past a sensor. Such a signal may be generated by locating a magnetic pickup adjacent the periphery of a gear such that an electrical signal of varying amplitude is produced in the pickup as the gear teeth rotate. The speed of rotation may be readily determined as a function of rate of occurrence of the signal transition. See for example U.S. Pat. No. 4,028,686, issued June 7, 1977 to Michael A. Wilson et al and the prior art cited therein.

In a system of the type described above, signal transitions can result not only from continuous rotation of the gear past the magnetic pickup but also from "jitter"; i.e., intermittent rotation in alternately opposite directions wherein a given gear tooth simply moves back and forth past the magnetic pickup. To distinguish between continuous motion and "jitter" the aforementioned patent to Wilson et al teaches the use of multiple sensors to generate a plurality of phase-shifted signals each representing motion of the same part and the logical combination of those signals to produce a sequence of related signal quantities. True continuous motion is indicated only by the occurrence of a complete sequence of the related signals, a partial sequence being taken as the result of "jitter".

The system of Wilson et al described above exhibits the disadvantage of requiring three or more sensors each with its attendant signal paths and magnetic pickup means. Moreover, the system of Wilson et al does not yield information identifying the direction of part motion or the net travel of a part moving for a significant period of time in one direction and later reversing to move for a significant period of time in the opposite direction.

The U.S. Pat. No. 4,142,152, issued Feb. 27, 1979 to Fincher teaches that the direction of movement of a rotating part can be obtained using only two sensors. However, the rotating part must itself be specially constructed so as to exhibit magnetic sections of precise circumferential length such that the two spaced sensors can be simultaneously actuated by a single magnetic section.

The present invention is directed to overcoming one or more of the problems as set forth above.

DISCLOSURE OF INVENTION

In one aspect of the invention a system is provided for monitoring the motion of a conventional dynamic part such as a rotating gear by generating two phase-shifted signals exhibiting transitions between discrete signal levels. The system distinguishes between continuous motion and "jitter", and, in addition, yields information pertaining to the direction of motion. In general, this is accomplished in a system which comprises sensor means for generating first and second phase-shifted signals which vary cyclically between opposite signal levels at a rate dependent upon the speed of part motion, decoder means connected to receive the first and second phase-shifted signals for generating a sequence of discrete output quantities representing different relationships between the input signal levels, an up/down counter, and logic means interconnecting the output of the decoder means to the counter in such a fashion as to count up when the decoder output sequence occurs in one order, to count down when the decoder output sequence occurs in the opposite order, and to refrain from counting at all unless and until a complete sequence of decoder outputs occurs.

BRIEF DESCRIPTION OF DRAWINGS

FIG. 3 illustrates the preferred waveforms which are produced in the embodiment of FIG. 1.

BEST MODE FOR CARRYING OUT THE INVENTION

Figure 1:
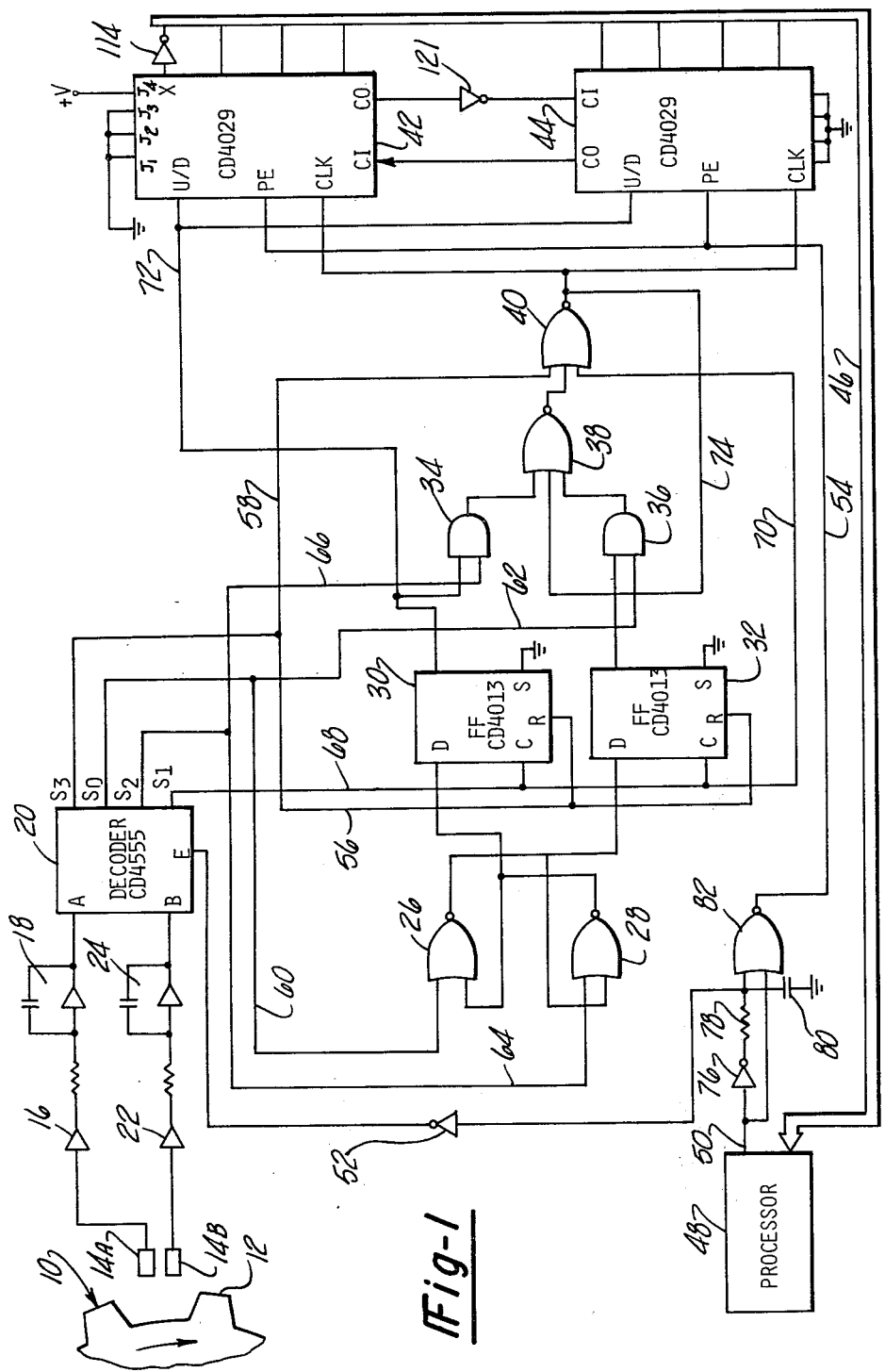
FIG. 1 illustrates an embodiment of the present invention in a system for monitoring the speed and direction of a rotating gear.

FIG. 1 illustrates an embodiment of the invention which monitors the speed and direction of rotation of a gear 10 having peripheral teeth 12. The system comprises a pair of magnetic sensors 14a and 14b which are disposed closely adjacent the gear teeth 12 to generate respective first and second signals which alternate between discrete signal levels as the gear teeth 12 rotate past the sensors 14a and 14b. Line A of FIG. 3 illustrates the preferred signal waveform produced by the sensor 14a and line B of FIG. 3 illustrates the preferred waveform of the sensor 14b. The phase-shifted relationship between the signals appearing in FIG. 3 is the result of the physical spacing between the sensors 14a and 14b measured along a line tangent to the direction of motion of the gear teeth 12.

Figure 4:
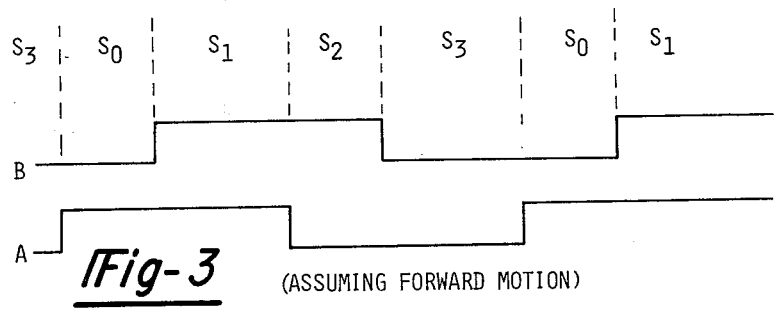
FIG. 4 is a truth table for the decoder which is employed in the embodiment of FIG. 1.

The signal output of sensor 14a is connected through a signal shaping network 16 and a low pass filter 18 to the A input of a two-to-four line decoder 20 such as CD 4555. Similarly, sensor 14b is connected through signal shaping network 22 and low pass filter 24 to the B input of decoder 20. The low-pass filters 18 and 24 protect against high frequency noise. Shaping networks 16 and 22 square up the more sinusoidal signals from the pickup coils of sensors 14a and 14b. Decoder 20 responds to the levels of the waveforms applied to the A and B inputs thereof and to the relationship between said levels to produce a sequence of four discrete output signals identified in FIG. 1 as S0, S1, S2 and S3. Assigning the discrete levels of the waveforms at the A and B inputs of decoder 20 binary signal values of "1" and "0", the output state of the decoder 20 is as represented in the truth table of FIG. 4.

The outputs S0 through S3 of decoder 20 are connected through appropriate conductors to logic means which interpret the decoder outputs as well as the order in which said outputs occur to determine the speed and direction of rotation of the gear 10 relative to the sensors 14. This logic means comprises a first state memory including NOR gates 26 and 28 which are cross-connected to form a bistable circuit, a middle state memory comprising flip-flops 30 and 32 and a third state detector comprising AND gates 34 and 36 and a third state clock memory including NOR gates 38 and 40 which are cross-connected to form a bistable circuit. Middle state memory flip-flops 30 and 32 may be implemented using integrated circuits CD 4013 and the combination of gates 34, 36 and 38 may be implemented using half of integrated circuit CD 4085. The output of gate 40 is connected to the clock input of counters 42 and 44, each of which may be implemented using a CD 4029 integrated circuit. Counters 42 and 44 are "up/down" counters, meaning that they may be incremented or decremented in accordance with the state of a signal applied to the U/D inputs of said counters by middle state memory flip-flop 30 as hereinafter described.

Eight outputs of counters 42 and 44 are connected by means of bus 46 to a processor 48 which is programmed to generate read commands and to interpret the 8-bit counter contents word to determine the net rotational displacement of gear 10. Processor 48 determines the net direction of rotation by the state of "signbit" inverter 114 and the speed of rotation as a function of the binary number represented by the 8 bits of counters 42 and 44 in a given time period. Processor 48 produces counter read signals on line 50, said signals being applied to the PE (preset) inputs of counters 42 and 44 by way of line 54 to reset the counters 42 and 44 to their initial state after reading. Counter 42 has the "carry-out" pin connected via inverter 121 to the "carry-in" pin of counter 44. The carry-out of counter 44 is connected directly to the carry-in of counter 42.

It will be appreciated that the output of a conventional magnetic coil sensor does not exhibit a sharp square waveform of the type preferred for digital circuit operation. Rather, it is sinusoidal in character and contains noise of a higher frequency super-imposed thereon. Signal shapers 16 and 22 square off the sensor waveforms in accordance with a comparison to a DC reference. These square up waveforms still contain unwanted noise pulses of very short duration, such noise pulses being filtered out by circuits 18 and 24.

The detailed interconnections between the components of the embodiments of FIG. 1 will now be described. The S3 output of decoder 20 is used as an initialization signal and is connected by way of line 56 to the reset input of each of the middle state memory flip-flops 30 and 32 to ensure that these flip-flops are reset whenever an input signal condition of "00" occurs. The S3 output is also connected by way of line 58 to one of the inputs of third state memory 38 and 40. The occurrence of a high signal value at S3 thus terminates any previous clock signal and ensures a low output from gate 40 to prevent a clock signal pulse from reaching either of the counters 42 and 44.

The S0 output is connected by way of line 60 to an input of NOR gate 26 and by way of line 62 to an input of AND gate 36. The S2 signal is connected by way of line 64 to an input of NOR gate 28 and by way of line 66 to an input of AND gate 34. Finally, the S1 output of decoder 20 is connected commonly by way of line 68 to the clock inputs of flip-flops 30 and 32 and also by way of line 70 to an input of NOR gate 40. In addition to being cross-coupled as previously mentioned, NOR gates 26 and 28 have their outputs connected to the data inputs of flip-flops 32 and 30 respectively to set those flip-flops in accordance with which of the $S_0$ and $S_2$ signals occur first after the $S_3$ signal, the order of occurrence of these two signals being determinative of the direction of gear rotation. Flip-flop 30 will be high if $S_0$ occurs after $S_3$ indicating forward motion and low if $S_2$ occurs. The output of flip-flop 30 is connected by way of line 72 to the count direction inputs of counters 42 and 44 and also to one of the inputs of AND gate 34 in the third state detector. The output of flip-flop 32 is connected to an input of AND gate 36, the other inputs to both gates 34 and 36 having been previously described. The outputs of AND gates 34 and 36 are connected as inputs to NOR gate 38, which acts as a latch circuit, since the output of NOR gate 40 is connected back by way of line 74 to the third input of NOR gate 38. The three inputs to NOR gate 40 comprise $S_1$, $S_2$, and the inverted value of its own output via line 74 and gate 38. The output of NOR gate 40 is connected to the clock inputs of counters 42 and 44. Thus the clock goes high on state $S_1$ if and only if $S_0$ or $S_2$ has followed $S_3$.

The read output signal line 50 is connected through inverter 76 and R/C time delay circuit 78, 80 to one input of NOR gate 82, and to decoder 20 through inverter 52. An uninverted read signal is connected to the other input of gate 82. The output of gate 82 is connected by way of line 54 to the preset enable input of each of the counters 42 and 44 to preset them a time delay after the read has occurred.

Figure 2:
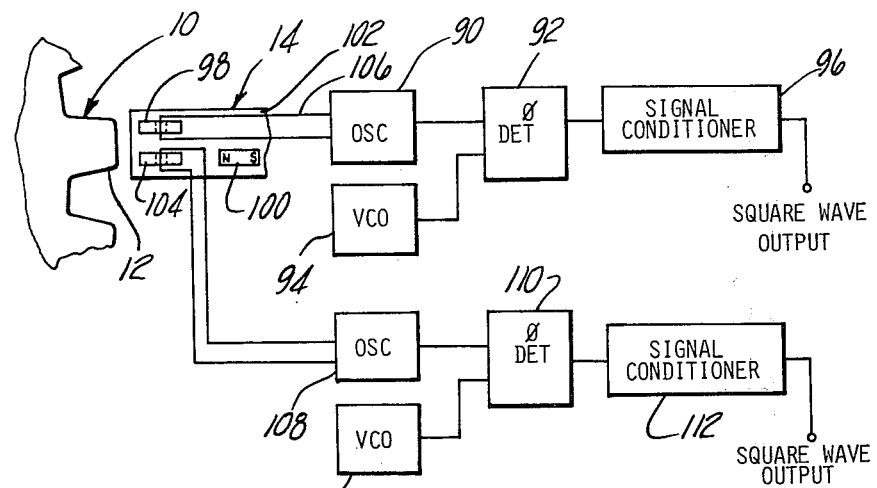
FIG. 2 is a schematic circuit diagram of a preferred signal generating means for use in the embodiment of FIG. 1.

A preferred implementation of the signal generating sensor 14 is shown in FIG. 2 to comprise an oscillator 90 having a tank circuit 106 in the form of a conductor which is linked through a magnetic core 98 imbedded in a plastic sensor body 102. As is further and more fully described in copending application, U.S. Ser. No. 150,252 filed Feb. 4, 1980, entitled "Velocity Sensing System", movement of the gear teeth 12 past the sensor body 102 varies the quantity of flux from permanent magnet source 100 which links the core 98 and hence tunes and detunes the tank circuit 106 of oscillator 90 to produce a recurring and alternating frequency shift between high and low frequency levels. The output of oscillator 90 is connected to an input of phase detector 92 along with a center frequency signal from voltage controlled oscillator 94. The high and low frequency components from oscillator 90 occur on opposite sides of the center frequency from voltage controlled oscillator 94 and hence produce a substantially digital signal output from phase detector 92; i.e., a signal having substantially the waveform shown in either of lines A or B of FIG. 3. The output waveform is shaped by shaping circuit 96 to form a square wave or rectangular wave signal which may be applied directly to the A input of decoder 20 as shown in FIG. 1. Core 98 is the counterpart of sensor 14a in FIG. 1 and adjacent core 104 is the counterpart of sensor 14b in FIG. 1, it being understood that the line shown linking core 104 forms the tank circuit for a second oscillator 108, phase detector 110, and shaping network 112 and VCO 113 which produce a second waveform in accordance with the circuit description already given.

INDUSTRIAL APPLICABILITY

The operation of the circuit of FIG. 1 will now be described with reference to application in determining the speed and direction of rotation of a motor drive gear in an hydraulic motor unit for a heavy offroad vehicle.

Rotation of gear 10 in one direction represents forward motion of one side of the vehicle and rotation of the gear 10 in the opposite direction represents reverse movement of that same side of the vehicle. Track vehicles which are steered by different rates and/or directions of rotation of independent left and right drive motors comprise two systems of the type described herein, one on each side of the vehicle.

Assuming rotation of motor gear 10 in a forward direction, the waveforms illustrated in FIG. 3 of the drawings result. These waveforms are shaped and filtered by circuits 16, 18, 22 and 24 and applied as input signals to the A and B inputs of decoder 20. Whenever the "00" conditions results, output S3 goes high applying a reset signal to both flip-flops 30 and 32. In addition, an input is applied to gate 40 to reset the clock memory and prevent the clock signal from reaching either of the counters 42 and 44. From state S3 decoder may either advance to S0 or regress to state S2. Assuming forward motion the output of decoder 20 advances to state S0 setting the output of gate 28 to a "1". This applies a data signal of "1" to the input of flip-flip 30 and "0" to the data input of flip-flop 32. A "1" also appears at one of the inputs to AND gate 36 but has no effect since each of the middle state flip-flops 30 and 32 are temporarily reset. Again no clock is passed to the counters 42 and 44 since the block memory (38 and 40) is reset.

Assuming continued rotation of gear 10, the decoder advances to state S1. Note that if "jitter" is occurring the decoder would regress to state S3 and the flip-flops 30 and 32 would simply be reset. However, advancing to state S1 clocks the data through flip-flop 30 applying a signal to the direction input (U/D) of counters 42 and 44 by way of line 72.

At this point decoder output S0 may reoccur holding all flip-flops 30, 32, 26 and 28 in their previous condition. In addition, gate 34 now has both inputs high to cause the clock memory (38 and 40) to become set. A high signal is transmitted from 40 to the clock inputs of each of the counters 42 and 44. This causes the counters to increment upwardly since the signal on line 72 is still high.

The low order counter 44 counts on each pulse whereas the high order counter 42 counts only when the carry-in (CI) input is low; i.e., when there is a "carry-out" indicated by a low on carry-out (CO) of counter 44. Counter 44 is prevented from counting when the counters 42 and 44 are full, by 121. The maximum count at the circuit output is thus represented by the binary number "01111111", with the high bit inverted by 114.

The sequence for a downcount is the opposite of the sequence for an upcount. S2 following S3 arms flip-flop 32 rather than flip-flop 30 and the transition from decoder output state S2 to S1 causes the output of flip-flop 32 to become a "1" while the output of flip-flop 30 remains at zero. This sets the output counters 42 and 44 to the downcount mode by holding the signal on line 72 to the low condition when a transition to decoder output state S0 produces a count signal.

To read the counters 42 and 44 it is necessary to disable the counters to the extent of preventing a count change. Therefore, whenever a read occurs indicated by the output on line 50 going high, the decoder 20 is disabled due to the enable input via inverter 52 going high and all outputs S0 through S3 go low. This prevents any of the flip-flops from changing state and prevents any clock signals from being transmitted to the counters 42 and 44. When the signal on line 50 goes low, both inputs to gate 82 are low for a time period determined by the time constant of resistor 78 and capacitor 80 causing the output of gate 82 to pulse high. This presets the counters 42 and 44 to "1000 0000" and the circuit output to "0000 0000", the first digit being inverted by inverter 114. The maximum forward count is "0111 1111" and the maximum reverse count is "1000 0000". No counts will be lost during a read operation provided that it occurs rapidly enough to prevent a transition of more than one state from the decoder during the period that line 50 is high.

A net direction change can be obtained by eliminating the preset function from gate 82, if only a fixed plus and minus travel of gear 10 is anticipated such that counter overflow will now occur.

The circuit which has been described above is susceptible of application to areas other than vehicle speed and direction determination. It will be readily apparent to those skilled in the art that the system may be applied in any industrial application wherein the position of a gear, shaft or other angularly or linearly translating body must be accurately monitored and wherein it is important to distinguish between substantially continuous movement and "jitter". Examples include position control systems for mass transit vehicles, elevators and similar devices, conveyors, robots, machine tools and article handling systems. In addition, it will be apparent to the skilled artisan that the hardwired circuit of FIG. 1 can be alternatively implemented using a microprocessor with sufficient memory and computational capability to perform the storage and logic functions of the process described herein.

Other aspects, objects and advantages of this invention can be obtained from a study of the drawings, the disclosure and the appended claims.

We claim:
1. Apparatus responsive to substantially continuous motion of a part (10) to determine the direction of motion of said part comprising:
   sensor means (14) operatively associated with the part (10) for generating first and second phase shifted signals (A, B);
   each of said first and second signals comprising a recurring series of opposite signal levels which occur at a rate dependent upon the speed of part motion relative to the sensor means (14);
   decoder means (20) having a pair of inputs (A, B) and a plurality of discrete outputs (S0, S1, S2, S3), said outputs being activated in a sequence dependent upon the signal levels applied to the inputs (A, B);
   said inputs (A, B) receiving the first and second signals (A, B) and producing a decoder output sequence which progresses according to the direction of motion of the part (10);
   up/down counter means (42, 44) having clock and direction inputs;
   and logic means (26, 28, 30, 32, 34, 36, 38, 40) connecting the outputs of the decoder to the inputs of the counter means to clock the counter only after the completion of a full sequence and in a direction determined by the order of said sequence.

2. Apparatus as defined in claim 1 further comprising means (48, 46) for reading the contents of said counter means (42, 44).

3. Apparatus as defined in claim 2 further comprising means (82) for resetting the counter (42, 44) upon operation of said means for reading.

4. Apparatus as defined in claim 2 wherein said means for reading (48, 46) further comprises means (52) for disabling said decoder means (20) during operation of said means for reading.

5. Apparatus as defined in claim 1 wherein said counter means comprises first and second order portions (42, 44).

6. Apparatus as defined in claim 1 wherein said logic means comprises first stage memory means (26, 28), second stage memory means (30, 32) and third stage gate means (34, 36, 38, 40).

7. Apparatus as defined in claim 6 wherein the first stage memory means comprises cross-coupled NOR gates (26, 28) connected to receive the first stage decoder outputs.

8. Apparatus as defined in claim 6 wherein the second stage memory means comprises a pair of flip-flops (30, 32) connected to receive the second stage decoder outputs.

9. Apparatus as defined in claim 6 wherein the third stage gate means comprises a pair of AND gates (34, 36) connected to receive the third stage outputs, and cross-coupled NOR gates (38, 40) connected to receive the outputs of said AND gates (34, 36).

10. In a system of the type which detects dynamic operating conditions as a result of the generation of a complete sequence of discrete signal quantities (S0, S1, S2, S3) representing continuous motion of a part (10) in a given direction, and having means (14, 16, 18, 20) for generating the sequence of signal quantities, the improvement which comprises:
    an up/down counter (42, 44) having a count direction input (U/D) and count increment input (CLK);
    first logic means (26, 28, 30) connecting one of the signal quantities to the count direction input to condition the counter to increment in a given direction only upon the subsequent occurrence of count increment input; and second logic means (34, 36, 38, 40) connecting another of the signal quantities to the count increment input;
    said first and second logic means in combination with said counter being operative to vary the direction of the count according to the order in which said one and another signals occur.

* * * * *